Patented Oct. 9, 1945

2,386,421

UNITED STATES PATENT OFFICE 2,386,421

METHOD OF PREPARING NEUTRAL SHELLAC SALTS

Henry Hall Bassford, Jr., Brooklyn, N. Y., assignor to U. S. Shellac Importers Association, Inc., New York, N. Y., a corporation of New York No Drawing. Application May 15, 1942, Serial No. 443,167

3 Claims. (Cl. 260—102)

This invention relates to a method of preparing neutral shellac salts.

Aqueous alkaline solutions of shellac are used as hat stiffeners, leather and shoe dressings, varnishes for paper, floor waxes, inks, adhesives, photoengraving solution, and the like. These solutions are frequently prepared using volatile alkalies such as ammonia and organic amines. They are made using native shellac as well as various processed lacs, such as bleached shellac, refined bleached shellac and hard lac.

The following difficulties have been reported by members of each of the above classes of shellac users. In the first place the bleached grades of shellac deteriorate and become insoluble after two or three months' standing, unless stored at temperatures common to refrigeration. Furthermore, even after standing a short time, the shellac tends to sinter together and form a hard resinous mass which must be broken up, in order to permit of its removal from the container. In the second place, due to the slowness with which shellac dissolves in aqueous alkali, it is necessary to heat said aqueous alkali to an elevated temperature of at least 80° C. in order to obtain a reasonably rapid reaction. When aqueous alkaline shellac solutions are prepared, therefore, using an open vessel, volatile amines and ammonia evaporate rapidly from solution and considerable losses occur before the base can react with the acid groups of the shellac. This evolution of ammonia or amines constitutes both a nuisance and a hazard, and, since additional alkali must be added to replace that lost by volatization, constitutes a waste as well. Furthermore, under these conditions, accurate control of the final solution is virtually impossible. Although the loss of base can be prevented, and the shellac solution made conveniently, in a closed pressure vessel equipped with suitable mechanical agitation, the high cost of equipment of this type prohibits its use by most users of shellac. In the third place, it is frequently desirable to prepare neutral aqueous solutions of amine or ammonium salts of shellac. When these are prepared using shellac and an aqueous solution of the volatile base, the solution is stirred and heated until the shellac is dissolved, additional alkali being added to replace that lost through evaporation. The solution is then boiled until the excess ammonia or amine has been driven off. Under these conditions some hydrolysis (and consequent impairment) of the shellac usually takes place. Even if a closed vessel is used it is difficult to prepare a neutral solution since the exact amount of alkali required is difficult to ascertain. The acid number of the various grades of shellac varies from 50 mg. KOH/gm. to over 100 mg. KOH/gm. Furthermore the acid number of a particular grade will vary dependent on its source and subsequent storage conditions. Even if the acid number is determined analytically, the proper quantity of alkali cannot be deduced, since uncontrollable hydrolysis of the first portion of lac dissolved by the hot alkaline solution, with resultant consumption of base, occurs during the dissolution process.

This invention has as an object the preparation of neutral salts of shellac with ammonia or volatile amines. A second object is the preparation of a stable, free-flowing, powdered derivative of refined and bleached shellac, which does not sinter or become insoluble on storage at room temperature. A third object is the preparation of neutral aqueous varnishes by merely dissolving the neutral shellac salt in hot or cold water. A fourth object is the preparation of alkaline shellac solutions, containing a volatile alkali, in an open vessel, without appreciable loss of base through evaporation. A fifth object is the preparation of alkaline shellac solutions in such a manner that the aqueous solution shall at all times have a pH of less than 7.5, thus minimizing the hydrolysis of the shellac during the dissolution process.

The first object is accomplished by subjecting the shellac in a finely divided condition to the moist vapor of the ammonia or amine whereupon the corresponding shellac salt is formed and then converting this product to an essentially neutral salt by aerating to remove excess ammonia or amine vapor.

The second object can be achieved either by preparing the neutral salt of the shellac as described above, or by subjecting the shellac to a controlled amount of amine or ammonia vapor, sufficient to neutralize any mineral acid which may be present in free or combined form but insufficient to convert more than a small percentage, (for example 5%) of the shellac to the amine or ammonium salt. Alternatively, the finely divided shellac may be stirred or tumbled in a closed vessel with 10 volumes of water containing ammonia or volatile amine slightly in excess of that required to neutralize the acidity of the shellac. The stirring is continued until the shellac swells and absorbs water, indicating formation of the shellac salt. The excess solution is then poured off and the solid product dried at room temperature for twenty-four hours, whereupon both the water and the small amount of excess ammonia or volatile amine which is absorbed in the shellac is removed by evaporation.

The other objects are readily attained by agitating the neutral shellac salt, prepared above, with three or more times its weight of hot water whereupon the shellac dissolves to form a neutral aqueous varnish, without loss of volatile alkali through evaporation, and without the pH of the solution going above 7.5 at any time during the dissolution process.

In this application the term "shellac" shall include all forms of lac, the secretion of the insect, Tachardia Lacca Kerr, whether in raw, refined or manufactured form. Modified lac is taken to include all forms of lac which have been materially modified by chemical means. "Bleached shellac" includes all forms of lac which have been decolorized by a bleaching process and include such products as "white lac," refined bleached shellac, "decolorized hard lac," et cetera.

Any amine volatile below about 120° C. and having a dissociation constant in water solution greater than $10^{-6}$ is suitable for preparing neutral shellac salts. Examples of amines which are suitable are morpholine, ethylene diamine, methyl amine, dimethyl-amine, and the like.

The following examples, in which parts are given by weight, are illustrative of my invention:

Example 1

200 parts of finely ground (preferably smaller than 40 mesh) refined bleached shellac are placed in a closed vessel and maintained at room temperature for twenty-four hours while being subjected to moist ammonia gas, which can be obtained, if desired, by allowing 22 parts of 28° Bé. aqua ammonia to evaporate from a separate container placed within the closed vessel. Alternatively, an air circulating system may be installed in which air, saturated by bubbling through aqueous ammonia, is placed through the shellac powder. Other methods such as mixing anhydrous ammonia gas and steam may also be employed.

The material, obtained in this manner, is spread out in trays and allowed to stand in a well ventilated room for twenty-four hours, to allow complete removal of excess ammonia and water vapor. The resulting product is essentially neutral ammonium shellacate.

Neutral aqueous solution of this product can be easily prepared by agitating the ammonium shellacate with three to four times its weight of water, preferably warmed to about 85° C. A uniform solution results after about twenty minutes agitation.

It was mentioned earlier in this specification that a purpose of this invention was the preparation of a stable variety of refined bleached shellac. We have found that the commercial varieties of this material, which deteriorate on storage at room temperature in from three to six months, invariably become practically insoluble in alcohol after eight hours air-drying at 60° C. The sample of refined shellac used in Example 1 became almost completely insoluble after only two hours at 60° C. The neutral ammonium shellacate prepared therefrom, however, remained completely soluble even after twenty-four hours air-drying at 60° C.

Example 2

The process described in Example 1 is satisfactory for ammonia and low molecular weight aliphatic amines, such as methyl amine, dimethyl amine, and the like. In certain cases, however, it is desired to prepare a neutral shellac salt of a higher boiling amine such as ethylene diamine or morpholine. In such cases the preceding process requires a prolonged time of exposure and may advantageously be replaced by the following procedure.

50 parts by weight of finely ground shellac are placed in a ball mill jar or other closed tumbling device containing 300 parts of water and 5.5 parts of morpholine. The mixture is tumbled until the mixture in the vessel swells and tends to adhere together, indicating that reaction has occurred between the shellac and morpholine. The solution is then decanted and the solid contents spread out to dry in open trays at room temperature. The dried product, the neutral morpholonium shellacate is readily soluble in hot water to form a neutral aqueous varnish.

Having described my invention, what I claim and desire to secure by Letters Patent is as follows:

1. A method for preparing a dry, neutral shellac salt of volatile alkali which comprises exposing the shellac, in finely divided form, to the moist vapor of a volatile alkali until a shellac salt of the alkali is formed and then aerating the salt to remove moisture and unreacted alkali.

2. A method for preparing a dry, neutral shellac salt of a volatile organic amine, volatile below about 120 deg. C., having a dissociation constant in water solution greater than $10^{-6}$, which comprises exposing the shellac, in finely divided form, to the moist vapor of the amine until a shellacate of the amine is formed and then aerating the salt to remove moisture and unreacted amine.

3. A method for preparing dry, neutral ammonium shellacate which comprises exposing the shellac, in finely divided form, to moist ammonia gas until a shellacate of ammonia is formed, and then aerating the salt to remove moisture and unreacted ammonia.

HENRY HALL BASSFORD, JR.